United States Patent [19]

Campbell et al.

[11] 4,360,554
[45] Nov. 23, 1982

[54] CARPET UNDERLAYMENT OF NEEDLED SCRIM AND FIBROUS LAYER WITH MOISTURE BARRIER

[75] Inventors: Frederick S. Campbell, West Mansfield, Mass.; Elwood G. Trask, Auburn, Me.; Walter Gasior, Attleboro; Roland Phaneuf, Barre Plains, both of Mass.

[73] Assignee: Albany International Corp., Albany, N.Y.

[21] Appl. No.: 278,833

[22] Filed: Jun. 29, 1981

[51] Int. Cl.³ .......................................... B32B 33/00
[52] U.S. Cl. ........................................ 428/91; 428/95; 428/234; 428/235; 428/252; 428/287; 428/300; 428/301; 428/359; 428/361; 428/429; 428/447
[58] Field of Search ................. 428/95, 234, 235, 252, 428/287, 429, 447, 300, 301, 359, 361, 91

[56] References Cited

U.S. PATENT DOCUMENTS 3,937,861  2/1976  Zuckerman .................. 428/234
4,172,170  10/1979  Foye .............................. 428/235

Primary Examiner—Marion McCamish
Attorney, Agent, or Firm—Kane, Dalsimer, Kane, Sullivan and Kurucz

[57] ABSTRACT

The disclosure is of an improved textile construction, useful as underlayment for carpeting. The construction comprises high temperature resistant staple fibers needled to a scrim of interwoven, high-temperature resistant yarns. The needled fabric has one surface treated to bond the surface fibers in place and one moisture-impervious film surface.

6 Claims, 4 Drawing Figures

CARPET UNDERLAYMENT OF NEEDLED SCRIM AND FIBROUS LAYER WITH MOISTURE BARRIER

BACKGROUND OF THE INVENTION

1. Field of the Invention

The invention relates to fabric constructions useful as underlayment for carpeting.

2. Brief Description of the Prior Art

A wide variety of fabric constructions have been used prior to our invention, as the underlayment or padding for a carpet installation. The simplest would be a pressed fabric or jute. More recently there has been introduced sheets of synthetic, polymeric resin foams.

In spite of the broad range of materials and constructions used in the prior art for carpet underlayments, there has remained a need for improvements. This is particularly so in regard to constructions which have improved properties of acoustic attenuation, fire retardancy, low smoke generation, durability and washability. The foam underlayments have come under particular criticism because they liberate toxic fumes when then burn.

The construction of the present invention is a textile underlayment for carpeting. It exhibits the desired improvements in acoustical insulation, fire retardancy, low smoke generation and durability. In addition, on a weight basis it may be made light enough for use as the underlayment of carpeting installed on aircraft (where weight is desirably held to a minimum). The liberation of toxic gases during burning is minimized.

SUMMARY OF THE INVENTION

The invention comprises a fire retardant, acoustic attenuating, pad which comprises;

- a layer of fibrous material in the form of discrete staple fibers, said layer being consolidated through entanglement of the individual fibers said entanglements being of the character produced by a needling operation, said fibers being of a synthetic, high-temperature resistant, polymeric resin; and
- a moisture barrier attached to one surface of the fibrous material layer.

The term "high-temperature resistant" as used herein means the yarns, fibers, resins, etc., do not decompose and burn at temperatures lower than about 350° F.

The term "staple fiber" is used in its conventional sense to mean fibers having an average length of 3 inches.

The article of the invention is particularly useful padding for use in aircraft.

DETAILED DESCRIPTION OF THE PREFERRED EMBODIMENTS OF THE INVENTION

Figure 1:
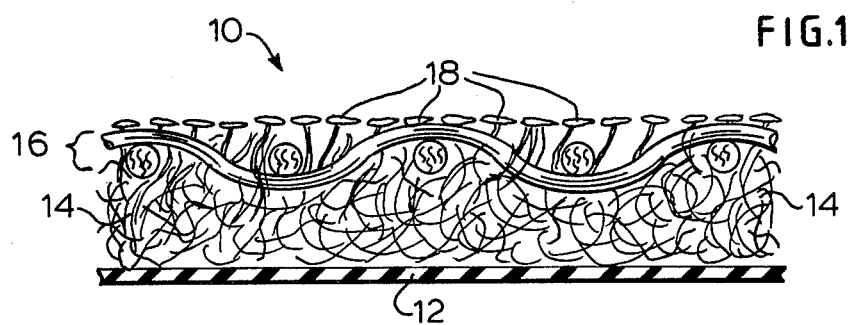
FIG. 1 is a cross-sectional, side elevation of a portion of a preferred embodiment construction of the invention.

FIG. 1 is a cross-sectional, side elevation of a preferred embodiment construction of the invention. The pad or underlayment 10 need not include but preferably comprises a woven scrim 16 of interwoven lengthwise yarns 20 and crosswise yarns 22. Alternatively, a knitted scrim would be equivalent to the woven scrim 16. The woven yarns 20, 22 are advantageously selected from high-temperture resistant textile yarns. Representative of such yarns are multifilament or spun yarns of high-temperature resistant fibers, such as fibers of aromatic polyamides. Preferred are multifilament or spun yarns of poly (m-phenylene isophthalamide), poly(p-phenylene terephthalamide) and the like.

Advantageously, the yarns 20, 22 will be characterized by a relatively high tensile strength, i.e.; on the order of at least about 4 lbs./end. Also, advantageously, the provided textile yarns 20, 22 will have relatively low stretch properties, for example on the order of at least about 4 to 5 percent ($\frac{1}{2}$ nominal breaking load) to about 25 to 35 percent.

The weave employed to fabricate scrim 16 is not critical. Any conventional weave may be employed, a plain open weave being stable and advantageous.

Advantageously, the denier of the yarns and the density of the weave is selected to provide a scrim weight of from about 2.5 to about 40 oz./square yard of optimum strength.

Attached by needling to the underside of the scrim 16 is a layer 14 of discrete staple fibers 24. The discrete staple fibers 24 such as presented in a non-woven fibrous batt, are needled to the above-described textile yarns 20, 22. The batts may be of randomly oriented staple fibers 24 or directionally oriented staple fibers 24 which are resistant to high-temperatures. Representative of such staple fibers 24 are fibers of the aromatic polyamides described above, including blends thereof and like fibers.

The batts of staple fibers 24 selected for needling to the textile yarns 20, 22 advantageously have a weight of from about 2.5 to about 40 oz./square yard. The staple fibers 24 may have a wide denier range. The batts may be pre-needled using conventional techniques to obtain some integrity of the fibers prior to needling the batt to the yarns 20, 22 in scrim 16.

In needling the fibrous batts to the yarns 20, 22 there is formed a layer of consolidated staple fibers, which through entanglement with the yarns 20, 22 becomes integrated therewith. The fibrous batts are needled to only the lower side of the yarns 20, 22 and fibers 24 are carried to the opposite, upper side to produce a light "nap" on that side, incorporating the yarns. The treatment of this "nap" will be described more fully hereinafter.

The techniques of needling fibrous batts to yarns and cloths woven or knitted from textile yarns are well-known and details need not be recited here. The coarseness of the felting needles used, the barb configurations, number, size and other variables are dependent somewhat on the degree of openness between the textile yarns, so as to avoid rupture of the textile yarns. In general, we have found a medium gauge needle, with the barbs oriented so as not to tear the yarns, adequate for needling. The needling frame may be fitted with either high or low density needle boards, a 90 density board being illustrative. Needling is preferably carried out to produce a needled fabric having a weight within the range of from about 4.5 to about 80 oz./square yard.

Following needling, it may be advantageous to calendar the needled materials wherein further consolidation is desired. The calendering further compacts and consolidates the staple fibers 24 to reduce fluid permeability of the fabric 10.

As described above, the upper surface 18 of the construction 10 would ordinarily have a light "nap" of protruding fibers 24 following needling of the layer 14 to scrim 16. This nap is undesirable, since it has the potential for losing fibers 24, which may adhere to the lower side of carpeting, etc. To remove the nap and form a fused, smooth surface 18 we singe the nap. Singeing of the nap may be carried out by passing the nap surface of the needled fabric over the gas flame of a conventional fabric singer, to melt, burn or otherwise remove loose fibers and "fuzz" created by loose ends of fibers 24. The exposure time of the nap surface to the open flame of the singer may be varied for different fabric materials. The technique and apparatus for singeing synthetic fabric surfaces are well-known; see for example U.S. Pat. Nos. 2,576,717; 2,677,869; 2,978,783; 3,134,158; 3,367,003; and 3,837,051. Singeing generally results in the formation of so-called "melt balls," i.e.; high volume, amorphous spheres of the resin left at the terminus of a singed fiber 24. Where the singed fibers 24 touch a yarn 20 or 22 or adjacent fibers 24, the melted end of the fiber may resolidify upon cooling in such a manner as to adhere with the touching yarn or fiber and become interlocked therewith. This is not objectionable and strengthens the fabric structure. These melt balls also generally make for a coarse hand or finish which provides a desirable frictional surface for the underlayment 10. Unexpectedly, it has also been found that the singeing treatment results in a product which exhibits lower smoke generation during combustion, than constructions not so treated. This is, of course, most advantageous.

Figure 4:
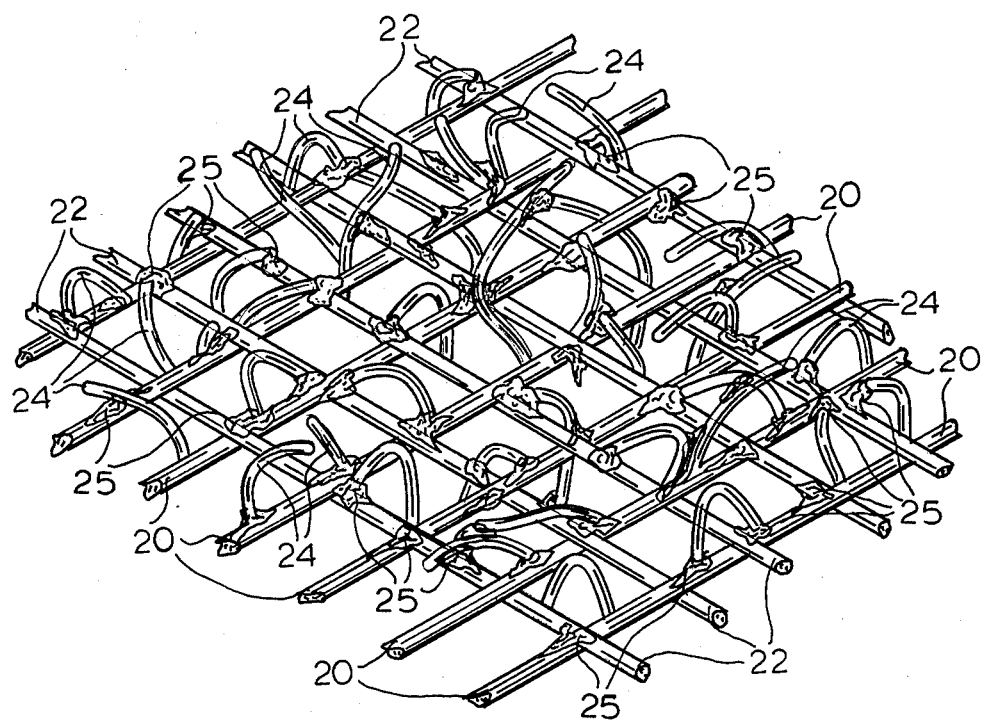
FIG. 4 is a view as in FIG. 2 of an alternate embodiment construction.

As an alternate to singeing, the surface fibers may be stabilized and anchored in the sub-surface of the underlayment by spraying the surface fibers with an adhesive. Representative of such adhesives are latex adhesives which upon drying will coat the exposed ends of the fibers 24 with an adhesive coating 25 as shown in FIG. 4. The FIG. 4 is a view as in FIG. 2 but where an adhesive coating 25 adheres the fiber 24 ends to each other and to the yarns 20, 22 of the scrim.

After singeing, it is advantageous to heat treat the fabric to effect maximum shrinkage and volatilize all finishes oils and resins inherently associated with the fibers and their associations. Heat treatment may be carried out by passing the fabric through a drying oven.

As shown in FIG. 1, there is affixed as a lower or base layer 12 in the embodiment construction 10, a layer of a water-impervious material. The layer 12 is a moisture barrier and may be a film of any water-impervious, synthetic polymeric resin. Preferably, layer 12 will be a resin characterized by low-flammability, low smoke generation upon combustion, etc. We particularly prefer as the layer 12 a layer or film of a non-cellular organopolysiloxane, most preferably the room temperature vulcanizing silicone rubbers (RTV) which are curable in the presence of air.

The construction 10 of the invention may be fabricated by applying the layer 12, such as a RTV silicone rubber forming composition (usually a flowable, viscous liquid or a paste; to the free surface of fibrous layer 14 and allowing the composition to cure, bonding to the layer 14. The layer 12 forming composition may be applied by conventional techniques such as by transfer coating to effect a smooth surface on top of the fabric. The layer 12 so applied advantageously has a thickness of from about 1.0 mils to about 1.5 mils.

The water-impervious layer 12 functions to protect the integrity of layer 14 and also functions as a non-skid, frictional surface.

Figure 2:
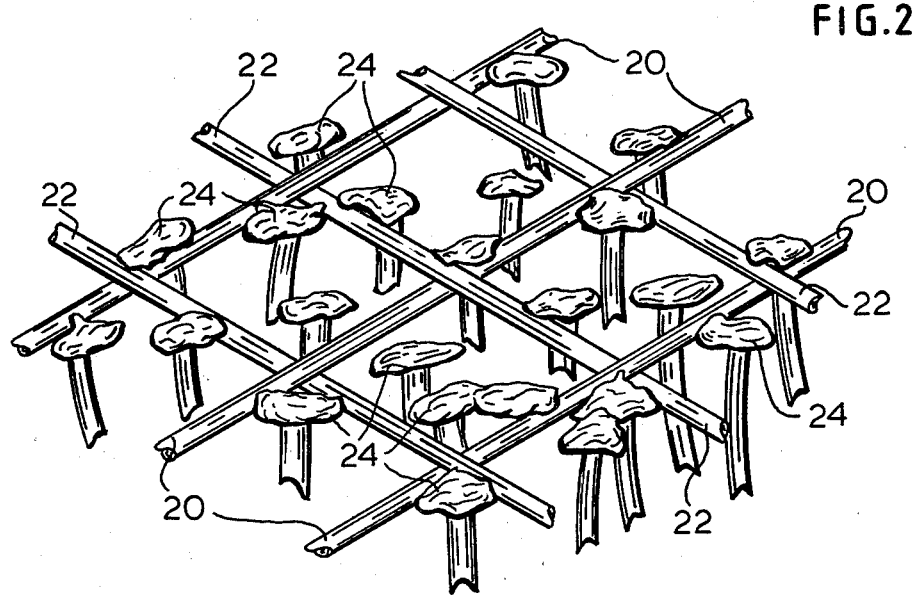
FIG. 2 is a top view, enlarged, of a portion of the construction shown in FIG. 1.

FIG. 2 is a top view enlarged, of a portion of the construction 10 as shown in FIG. 1 and shows details of the singed upper surface.

Figure 3:
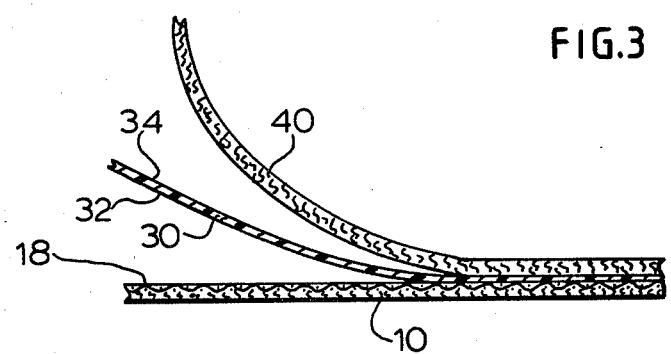
FIG. 3 is a side elevation of a portion of the construction of FIG. 1, shown in association with conventional carpeting.

FIG. 3 is a side elevation of the embodiment construction 10 shown being installed as an underlayment for carpeting 40. Inserted between the surface 18 of construction 10 and the bottom of carpet 40 is a 2-sided adhesive tape 30 having adhesive surfaces 32, 34. The adhesive tape 30 functions as a temporary bond to hold the underlayment construction 10 in place with the carpet 40. When it is desired to clean under carpet 40, the bond can be removed by pulling the carpet 40 up and then pulling the tape 30 up. In doing so, fibers are not removed from the construction 10, tape 30 is not covered with loose fibers and may be reusable. Since the surface of the construction 10 is not damaged by the pulling out of loose fibers, the construction 10 can be reused a plurality of times as the underlayment of carpet 40. This is an important economic advantage (in the prior art, polymeric resin foam underlayments were damaged and could not be reused after tape 30 was removed). These are economic and labor saving advantages. These advantages flow from the nature of the singed surface 18.

The construction 10 of the invention may be subjected to conventional treatments to improve further such physical properties as flame retarding, water repellency and the like. Thus, flame retardants and/or water repellents may be impregnated in the fabric of construction 10. We prefer to treat the construction 10 with a conventional water repellent such as a fluoropolymer.

The following example describes the manner and process of making and using the invention and sets forth the best mode contemplated by the inventors of carrying out the invention, but is not to be construed as limiting. In carrying out the example, the following tests were employed.

FIRE RETARDANCY:
UL94V Test Procedure
Water Repellency:
Determined according to the testing procedure set forth in Federal Test Method #191.

EXAMPLE

A woven nomex scrim of 2.5 to 3.3 ozs. per square yard and comprised of 12 ends and 9 picks respectively per inch is provided as the base or scrim fabric. A 5.0 oz. per sq. yard carded nomex batt is needled to the scrim followed by two additional needlings such that there is sufficient inner laminar strength to avoid delamination. The needled fabric is singed on one face only to remove loose or protruding surface fibers. This is done by passing the fabric over a gas flame. The singed fabric is then heat treated in a radiant over at temperatures of 650°–670° F. To effect maximum shrinkage, volatilize all finishings, oils and resins and drive off volatile components inherent in such fibrous structures. Following heat treatment, the fabric is treated to render it water repellent with a fluoropolymer resin add-on of less than about 1% by weight. The fabric is then transfer coated on the felt side only with 1 to 1.5 mils of an organopolysiloxane to give a smooth surface. The opposite side of the fabric may be surface sprayed with 1% to 5% by weight of a latex adhesive to further aid in resistance to fiber shedding and pull out if desired.

The finished carpet underlayment, upon testing shows the following physical properties:

FIRE RETARDANCY:
U.94V Rating of 0

WATER REPELLANCY:
AC 6/23/81
Hydrostatic head resistance of 10 cm (uncoated).

What is claimed:

1. A fire retardant, acoustical attenuating, low smoke, article, which comprises:
   a scrim of interwoven, high-temperature resistant textile yarns characterized in part by their high tensile strength and low stretch; said scrim having an upper surface and a lower surface;
   a layer of fibrous material in the form of discrete staple fibers, attached to the lower surface of the scrim, said layer being consolidated through entanglement of the individual fibers and integrated with said yarns by entanglement of the fibers therewith, said entanglements being of the character produced by a needling operation, said fibers being fibers of a synthetic, high-temperature resistant, polymeric resin;
   a layer of said fibers on the upper surface of the scrim, characterized by their adherence to the sub-surface of the underlayment and having been singed; and
   a moisture barrier attached to the free surface of the fibrous material layer.

2. The underlayment of claim 1 wherein the yarns are yarns of aromatic polyamide fibers.

3. The underlayment of claim 1 wherein the resin is an aromatic polyamide.

4. The underlayment of claim 1 wherein the moisture barrier is a layer of an organopolysiloxane.

5. The underlayment of claim 4 wherein the organopolysilocane is an RTV silicone rubber.

6. The underlayment of claim 1 wherein the fibers on the upper surface of the scrim are adhesively bonded to each other and/or to the scrim yarns.

* * * * *